United States Patent [19]
Miller

[11] Patent Number: 4,472,781
[45] Date of Patent: Sep. 18, 1984

[54] POWER SUPPLY SYSTEM

[75] Inventor: Roland G. Miller, New Milford, Conn.

[73] Assignee: Pitney Bowes Inc., Stamford, Conn.

[21] Appl. No.: 306,805

[22] Filed: Sep. 29, 1981

[51] Int. Cl.³ .............................................. G06F 15/20
[52] U.S. Cl. ................................... 364/466; 323/267; 364/480
[58] Field of Search ............... 364/464, 466, 480, 481, 364/483; 323/267; 363/15

[56] References Cited

U.S. PATENT DOCUMENTS

| | | | |
|---|---|---|---|
| 2,934,009 | 10/1956 | Bach et al. | 101/235 |
| 3,671,853 | 6/1972 | Weischedel et al. | 323/267 |
| 3,938,095 | 2/1976 | Check, Jr. et al. | 364/900 |
| 3,978,457 | 8/1976 | Check, Jr. et al. | 364/900 |
| 4,280,179 | 7/1981 | Jones, Jr. et al. | 364/464 |
| 4,285,050 | 8/1981 | Muller | 364/900 |
| 4,287,825 | 9/1981 | Eckert, Jr. et al. | 101/91 |
| 4,393,454 | 7/1983 | Soderberg | 364/466 |

FOREIGN PATENT DOCUMENTS

| | | | |
|---|---|---|---|
| 0019515 | 9/1979 | European Pat. Off. | |
| 52-54918 | 5/1977 | Japan | 363/15 |
| 2062311 | 10/1979 | United Kingdom | |
| 0677051 | 8/1979 | U.S.S.R. | 363/15 |

Primary Examiner—Errol A. Krass
Assistant Examiner—Clifford L. Tager
Attorney, Agent, or Firm—David E. Pitchenik; William D. Soltow, Jr.; Albert W. Scribner

[57] ABSTRACT

A power supply system includes a switching type regulated power supply operable to provide switched regulated D.C. output voltages. A first winding having a first terminal and a second terminal is provided. The first terminal is connected to be energized by the switched D.C. output voltage of the switching type regulated power supply such that a switched D.C. voltage is developed at the second terminal of the first winding. A second winding electromagnetically coupled to said first winding and having a first and a second terminal is also provided. A capacitor and a diode are coupled between the first and the second terminal of the first winding. Means connect the diode and the capacitor to the first terminal of the second winding.

The power supply system may be part of a postage meter system. A postage meter includes accounting means operatively coupled to a postage printing means. The accounting means accounts for postage printed by the printing means. The accounting means include a nonvolatile memory for storing accounting and other data when no power is being supplied to the meter.

24 Claims, 3 Drawing Figures

POWER SUPPLY SYSTEM

FIELD OF THE INVENTION

The present invention relates to power supply systems and more particularly to power supply systems for electronic postage meters having nonvolatile memory.

BACKGROUND OF THE INVENTION

Electronic postage meter systems have been developed as for example the systems disclosed in U.S. Pat. No. 3,978,457 for Microcomputerized Electronic Postage Meter Systems, in U.S. Pat. No. 3,938,095 for Computer Responsive Postage Meter and in European Patent Application, Application Number 80400603.9, filed May 5, 1980 for Electronic Postage Meter Having Improved Security and Fault Tolerance Features. Electronic postage meters have also been developed employing plural computing systems. Such a system is shown in U.S. patent application Ser. No. 089,413, filed Oct. 30, 1979, now U.S. Pat. No. 4,301,507, for Electronic Postage Meter Having Plural Computing Systems and assigned to Pitney Bowes Inc.

The accounting circuits of electronic postage meters include nonvolatile memory capability to store postage accounting information. This information includes, for example, the amount of postage remaining in the meter for subsequent printing or the total amount of postage printed by the meters. Other types of accounting or operating data may also be stored in the nonvolatile memory. The memory function in the electronic accounting circuits have replaced the function served in previous mechanical type postage meter by mechanical accounting registers. Postage meters with mechanical accounting registers are not subject to the many problems encountered by electronic postage meters. Conditions cannot normally occur in mechanical type postage meters that prevent the accounting for a printing cycle or which result in the loss of data stored in the registers. Moreover, in mechanical postage meters it is not necessary to electronically monitor the position of the mechanical components associated with printing postage. This, however, is not the case with electronic postage meters.

Conditions can occur in electronic postage meters where information stored in electronic accounting circuits can be permanently lost. Conditions such as a total line power failure of fluctuation in voltage conditions can cause the microprocessor associated with the meter to operate erratically and either cause a loss of data or the storage of spurious data in the nonvolatile memory. Moreover, excessive heat within the confines of the meter housing can damage the nonvolatile memory, especially during a memory WRITE cycle for NMOS type nonvolatile memories. The loss of data or the storage of spurious data may result in a loss of information representing the postage funds stored in the meter. Since data of this type changes with the printing of postage and is not stored elsewhere outside of the meter, there is no way to recover or reconstruct the lost information. In such a situation, a user may suffer a loss of postage funds.

To minimize the likelihood of a loss of information stored in the electronic accounting circuit, efforts have been expended to insure the high reliability of electronic postage meters. Some systems for protecting the critical information stored in the meter are disclosed in the abovenoted patents and applications. An additional arrangement to protect the postage meter accounting information is shown in U.S. Pat. No. 4,285,050 for Electronic Postage Meter Operating Voltage Variation Sensing System.

SUMMARY OF THE INVENTION

It has been recognized that the power supplies for electronic postage meters must have a very high efficiency so that if a power failure occurs, sufficient operating voltage remains during the time required to transfer certain critical information resident in volatile memory to nonvolatile memory and to complete accounting transactions in progress. This must be achieved without the generation of noise which could result in spurious information being transferred to the nonvolatile memory. Even during normal, quiescent operation, the noise factor associated with the power supply must also be such that erroneous information is not written into the volatile memory of the meter.

Since the electronic accounting circuits of the postage meter may be subject to the effects of electromagnetic radiation, they are desirably shielded by one or more enclosures. However, the power supply for the meter may also be housed within one of the enclosures shielding the accounting circuits and can even be located in close proximity to the accounting circuits. Thus, it is desirable that the power supply not generate excessive heat. Such heat may adversely affect the nonvolatile memory and other solid state devices. Moreover, it has been recognized that it is desirable to keep the power supply physically associated with and part of the meter. In the event of an external power failure, the power supply within the secure housing continues to generate a sufficient, regulated power, for at a sufficient time to orderly and accurately transfer critical information from volatile memory to nonvolatile memory. This problem is compounded because certain nonvolatile memories need several different voltages for proper operation. As an example, one type of solid state nonvolatile memory requires the presence of three different voltages for a WRITE operation.

It has been discovered that a power supply system according to the present invention, involving only one switching regulator, can be employed to generate a plurality of voltages necessary to operate such memories. The supply can energize both the microprocessor and associated nonvolatile memory of a postage meter.

A power supply system embodying the present invention includes a switching type regulated power supply operable to provide switched regulated D.C. output voltages. A first winding having a first terminal and a second terminal is provided. The first terminal is connected to be energized by the switched D.C. output voltage of the switching type regulated power supply such that a switched D.C. voltage is developed at the second terminal of the first winding. A second winding electromagnetically coupled to said first winding and having a first and a second terminal is also provided. A capacitor and a diode are coupled between the first and the second terminal of the first winding. Means connect the diode and the capacitor to the first terminal of the second winding.

In accordance with a feature of the invention, a postage meter includes accounting means operatively coupled to a postage printing means. The accounting means account for postage printed by the printing means. The accounting means include a nonvolatile memory for storing accounting and other data when no power is being supplied to the meter. A first winding is provided with a first and second terminal. The first winding first terminal is energized from a source of alternating voltage. A second winding oppositely poled to the first winding is electromagnetically coupled to the first winding. A series connected capacitor and diode are connected between the first and the second terminal of the first winding. First circuit means are coupled between the second terminal of the first winding and the accounting means. Second circuit means are coupled between the second winding and the accounting means.

In accordance with a further feature of the invention, the second winding may have a tap connection with third circuit means provided, coupling the tap connection to the accounting means.

DETAILED DESCRIPTION OF THE DRAWINGS

Figure 1:
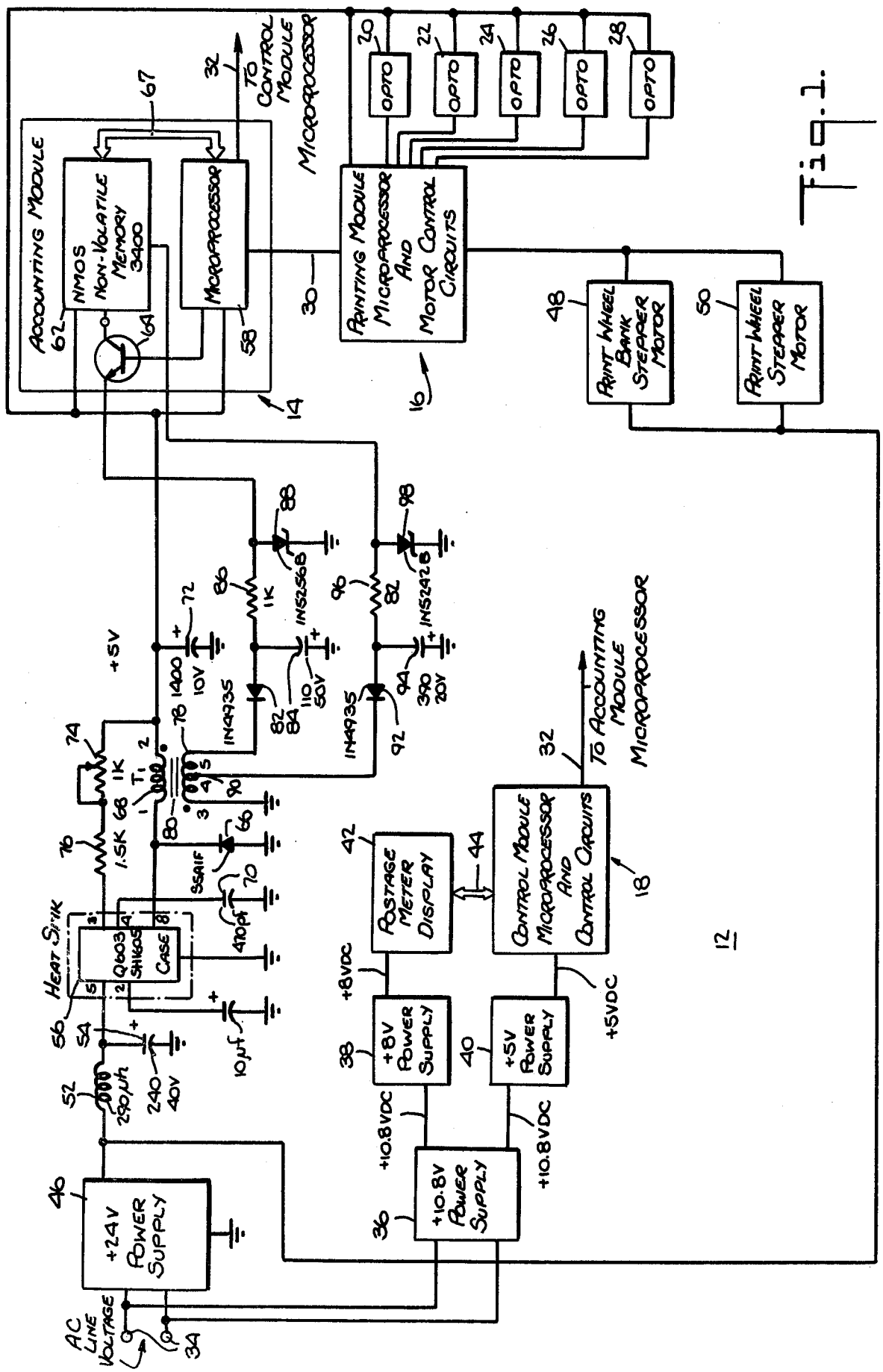
Figure 2:
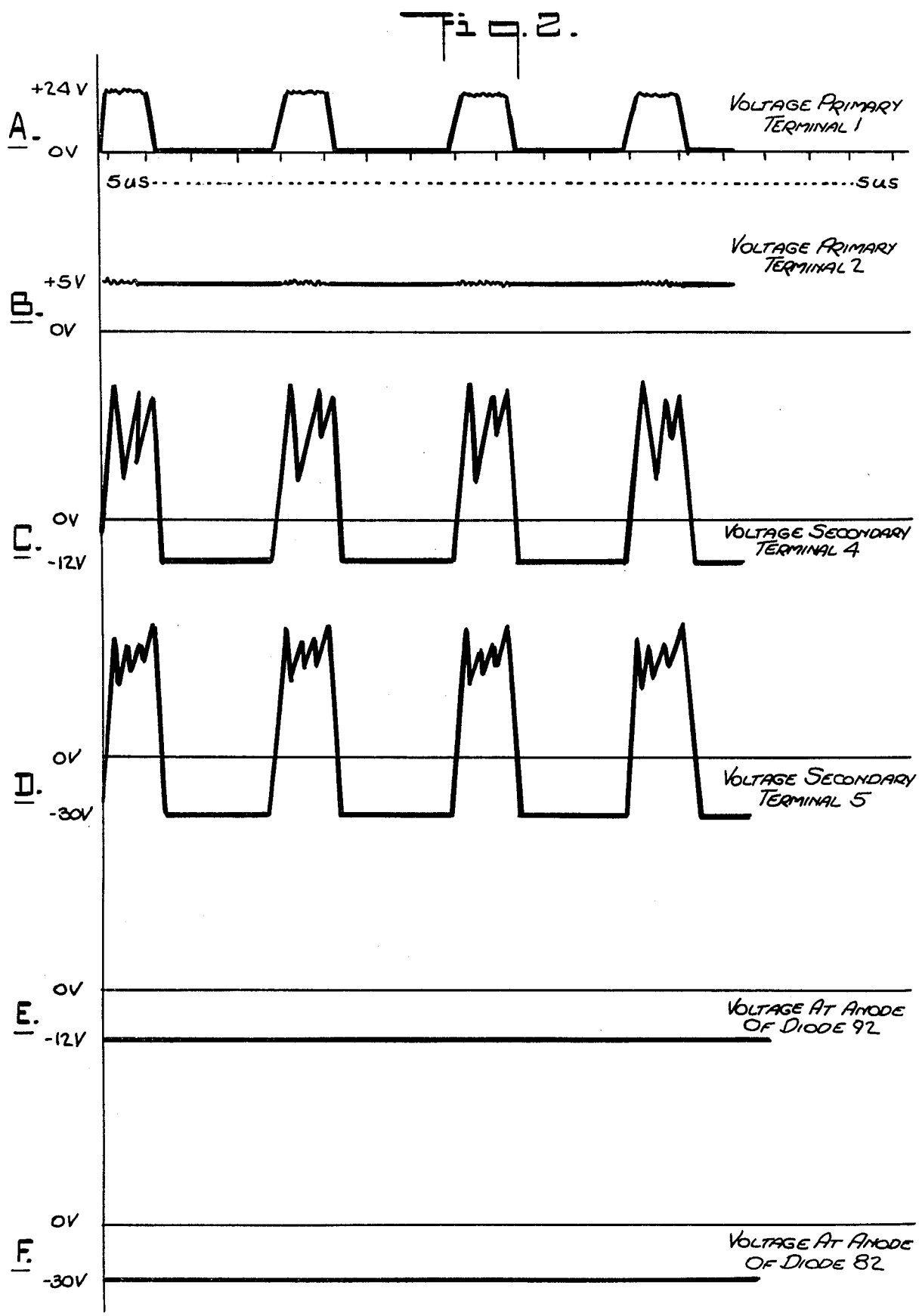
Figure 3:
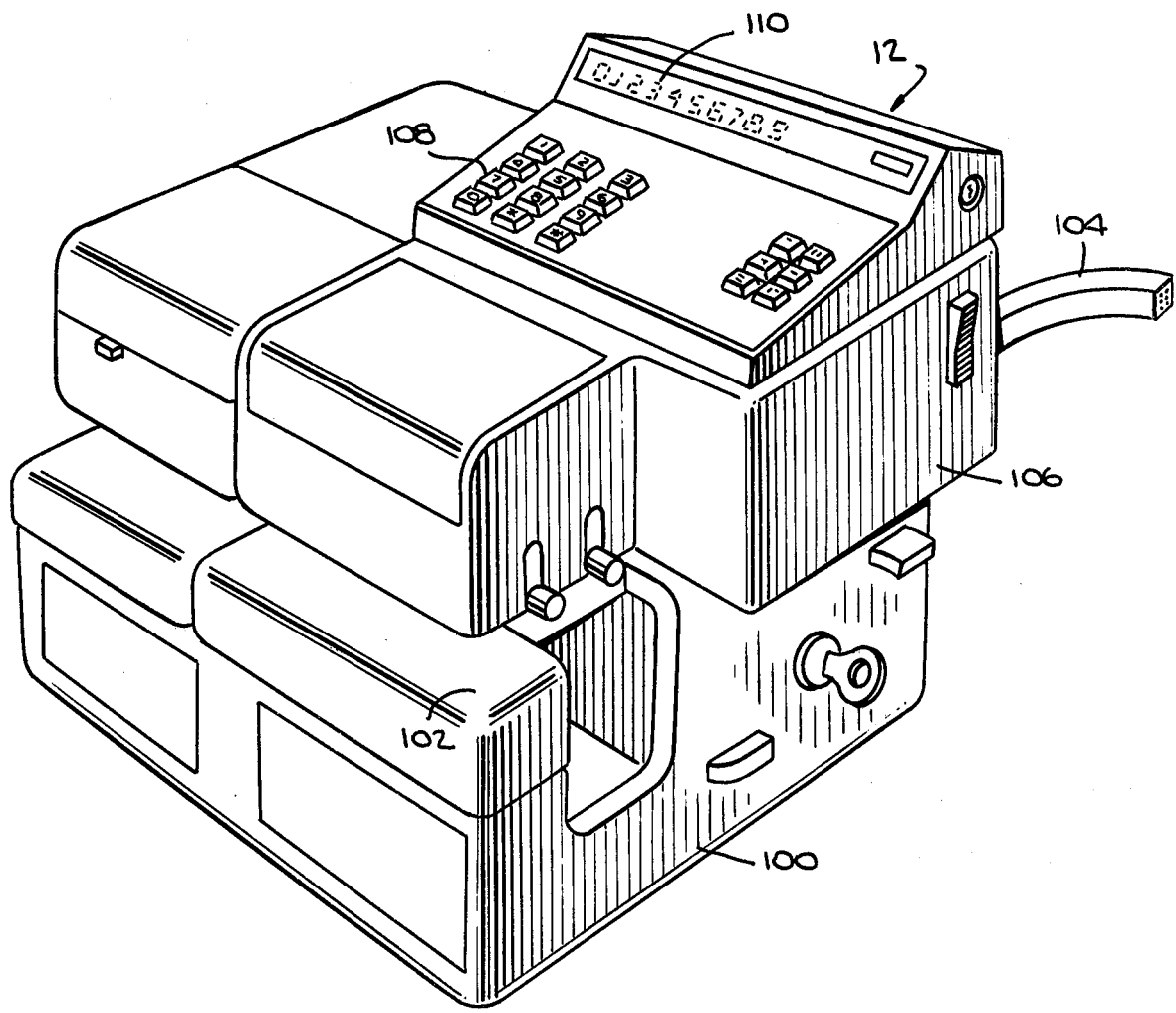

A complete understanding of the present invention may be obtained from the following detailed description thereof, when taken in conjunction with the accompanying drawings, in which:

FIG. 1 is a schematic circuit diagram, partly in block form, of an electronic postage meter power supply system embodying the present invention;

FIGS. 2A-F are a series of voltage wave forms at the transformer terminals in the power supply system helpful in understanding the operation of the circuit shown in FIG. 1; and FIG. 3 is a perspective view of an electronic postage meter showing the outer housing, the meter keyboard and meter display.

DETAILED DESCRIPTION

Reference is now made to FIG. 1. A postage meter 12 includes: an accounting module 14 having a microprocessor and nonvolatile memory such as a General Instrument Corporation ER3400 type electronically alterable read only memory (this device is described in a General Instrument Corporation manual data November 1977, entitled EAROM designated by number 12-11775-1); a printing module 16 having microprocessor and motor control circuits; and a control module 18 having microprocessor and control circuits. The details of construction and operation of the system may be in accordance with the postage meter systems and the mechanical apparatus shown in the above-noted patent application for Electronic Postage Meter Having Plural Computing Systems and in U.S. Pat. No. 4,287,825 for Printing Control System. Postage meter 12 includes a series of opto-interrupters 20, 22, 24, 26, and 28. The opto-interrupters are used to sense the mechanical position of the parts of the meter. For example, the opto-interrupters can be employed to sense the position of the shutter bar which is used to inhibit operation of the meter under certain circumstances, the position of the digit wheels, the home position of the print drum, the position of the bank selector for the print wheels, the position of interposer, or any other movable mechanical component within the meter. These opto-interrupters are coupled to the printing module 16 which monitors and controls the position of the mechanical components of the meter.

The printing module 16 is connected to the accounting module 14 via a serial data bus 30 and communicates by means of an echoplex technique described in the above-noted U.S. Patent Application for Electronic Postage Meter Having Plural Computing Systems. Both ends of the bus are buffered by an optics buffer, not shown, which is energized by the power supply +5 volt line to be hereafter described. Similarly, the control module 18 is connected to the accounting module 14 via a serial data bus 32 and also communicates by means of the echoplex technique. Optics buffers, not shown, are provided to buffer the bus. It should be recognized that the particular architecture of the postage meter system is not critical to the present invention. Plural or single microprocessor arrangements may each be employed with the present invention.

A source of operating voltage, such as 110 volt 60 cycle supply, is applied across the meter input terminals 34. The voltage is applied to a linear 10.8 volt power supply 36. The ouput from the 10.8 volt linear power supply 36 is supplied to a first 8 volt linear regulated power supply 38 and to a second 5 volt linear regulated power supply 40. The 8 volt supply is used to power a display 42 which is operatively coupled via a bus 44 to the control module 18. The output from the power supply 40 is directly coupled to the control module 18 and is operated to energize the control module microprocessor.

The AC operating voltage at terminals 34 are also applied to a silicone controlled rectifier type, 24 volt power supply 46. The regulated output from the power supply 46 is applied to the printwheel bank stepper motor 48 and the printwheel stepper motor 50 associated with the printing module 16. The 24 volt DC is coupled by an AC choke 52 to capacitor 54. The internal capacitance within the 24 volt power supply 46 provides sufficient energy storage to continue to properly energize a regulated switching regulator 56 should an AC power failure occur at terminals 34. In such event, the accounting module microprocessor 58 transfers information from the postage meter volatile memory (which may be internal or external to the microprocessor) via the data bus 67 to a nonvolatile memory 62. The switching power supply 56, in conjunction with a transformer with related circuitry, provide regulated output voltages used to energize the accounting module.

A plus five volts is developed and is applied to the accounting module microprocessor 58, to NMOS nonvolatile memory 62, to the optic buffers (not shown) for the serial data bus 30 connected between the accounting and printing modules, to the printing module 16, and to the opto-interrupters 20-28. A minus 30 volts is also developed and is applied via an NPN transistor 64 to the nonvolatile memory 62. The operation of transistor 64 is controlled by the accounting module microprocessor 58. The minus 30 volts is required in conjunction with a minus 12 volts which is also developed and applied to the nonvolatile memory 62 and the plus five volts to enable the nonvolatile memory to have data written into the device.

The switching regulator power supply 56 functions to selectively apply the 24 volts developed across the capacitor 54 to the junction of a diode 66 and poled transformer primary winding 68. The frequency at which the regulator 56 operates or switches is determined by a capacitor 70 which controls the operating frequency of the supply. Primary winding 68 is further coupled to ground by a capacitor 72. Diode 66 and capacitor 72 form a complete circuit in series with the primary winding 68. The circuit path is through a point of fixed reference potential, here shown as ground.

During quiescent operation, a +5 volts is developed across capacitor 72. This voltage is sensed and coupled via a series connected variable resistor 74 and a fixed resistor 76 to an input terminal on the regulator supply 56. The feed back path controls the supply to maintain a constant voltage across capacitor 72. For the component values shown, a voltage variation of approximately 10 millivolts can occur across the capacitor 72. A step up secondary winding 78 oppositely poled to the primary winding and is electromagnetically coupled via a mollypermoly core 80 to the primary winding 68. The secondary winding 78 is connected to ground at one end and has its opposite end coupled via a diode 82 which operates in conjunction with a capacitor 84 and current limiting resistor 86 to develop a −30 volts across a zener diode 88. A center-tap 90 on the secondary winding 78 is connected to a diode 92 which operates in conjunction with a capacitor 94 and a current limiting resistor 96 to develop a −12 volts across a zener diode 98.

Because of the filtering provided by capacitor 72 and the inductance of the primary winding 68, the noise introduced by the switching transients in the primary circuit is minimized. In a like manner, the capacitors 84 and 94 and the inductance of the secondary winding 78, provide further filtering which also minimizes the noise introduced by the switching transients.

In operation, when the switching regulator 56 is on ($t_{ON}$), +24 volts is applied to terminal 1 of primary winding 68. The time constant created by the inductance of the primary winding 68 and the capacitance of the capacitor 72 allow capacitor 72 to charge a predetermined rate toward +5 volts. When the proper voltage level is achieved, the feed-back circuit including resistors 74 and 76 and the control network within the supply, causes the switching regulator 56 to turn off the +24 volts applied to terminal 1 of primary winding 66. When the power is turned off, the energy stored in the inductance of primary winding 66 is passed to ground via the diode 66. At this time ($t_{OFF}$), terminal 1 of primary winding 68 is classified at −0.7 volt. The voltage at terminal 2 of primary winding 68 remains at a positive voltage, near +5 volts.

It has been discovered that the energy being dumped through the diode 66 during the off time of switching regulator 56 can be beneficially used to generate additional voltages for utilization within the postage meter. This is of particular value in reducing the number of power supplies and thereby the associated heat required to be dissipated within the walls of the postage meter housing.

At the time when the switching regulator 56 is turned off, the polarity of the voltages across the primary winding 68 reverse and terminal 1 becomes negative with respect to terminal 2 of primary winding 68. The voltage at the junction of the capacitor 72 and the primary winding 68, however, is fixed at 30 5 volts and is blocked from discharging by the diode 66. The turn ratio between the primary and the secondary windings is selected to step up the voltages in the secondary winding to generate the required −12 and −30 voltages. There is no current flow in the secondary winding 78 when the switching regulator 56 is turned on because the windings are in a "bucking" mode. That is, the flux generated by the current flowing through the primary winding 68 is in a direction which is opposite to that of the flux generated by the current flowing in secondary winding 78. Thus, when the switching regulator 56 is turned on, the primary winding 68 drains energy from the secondary winding 78, and when the switching regulator 56 is turned off, the secondary winding 78 drains energy from the primary winding 68. The transformer as shown in FIG. 1 may be in accordance with the following specifications:

primary inductance—550±10% uh
permeability of core—125 nominal
core inductance—68 MH per 1000 turns
mean length of magnetic path—5.18 CM
DC resistance of core per millihenries nominal—0.124 OHMS
primary number of turns—90
primary winding wire gauge—22 gauge (AWG
secondary winding ∩ 260 turns—650 turns tapped
secondary windings—190 34 AWG wire The various voltages wave forms developed at the terminals of transformer is shown in FIG. 2. The voltage wave forms at terminals 1 and 2 of the primary winding 68 and terminals 5 and 4 of secondary winding 78 are shown respectively in FIGS. 2A, 2B, 2C, and 2D. The voltage at terminal 3 is not shown but is held fixed at ground potential. The voltage developed at the anodes of diodes 92 and 82 are shown in FIGS. 2E and 2F, respectively. The three D.C. voltages for the postage meter system shown in FIG. 1 are developed at: terminal 2 of the primary winding and is shown in FIG. 2B (+5 volts); the anodes of diode 92 and is shown in FIG. 2E (−12 volts); and, the anode of diode 82 and is shown in FIG. 2F (−30 volts).

Reference is now made to FIG. 3 which is a perspective view of an electronic postage meter suited to incorporate the present invention. The postage meter 12 is detachably secured to a base unit 100 so as to form a letter slot 102 therebetween at the front edge of the assembly. The base unit 100 may be mechanically of the type disclosed, for example, in U.S. Pat. No. 2,934,009 issued to Bach et al for Sheet Feeding and Treating. The base incorporates a mechanical drive, not shown, for providing mechanical drive energy for the printing drum of meter 12. The postage meter 12 is an electronic postage meter in the sense that the accounting system within the meter, including the registers, is electronic as opposed to mechanical. Power is supplied to the meter 12 via an AC power cord 104. The power cord 104 is connected to terminal 34 within the conductive shielding provided by the metal meter housing 106. A keyboard 108 and display 110 are provided and are connected to the control module 18 microprocessor and control circuit.

What is claimed is:
1. A postage meter of the type adapted to be energized by an external source of AC electrical power, comprising:
   means for printing postage;
   accounting means operatively coupled to said printing means for accounting for postage printed by said printing means;
   said accounting means including nonvolatile memory means for storing accounting data when no external electrical power is being supplied to said postage meter;
   a first winding having a first and a second terminal;
   first means coupled between said first winding first terminal and said external source of AC power;
   a second winding oppositely poled to and electromagnetically coupled to said first winding;

a capacitor and a diode connected in series between said first and said second terminal of said first winding;

said second terminal of said first winding being connected to said accounting means; and first circuit means coupled between said second winding and said accounting means.

2. A postage meter as defined in claim 1 wherein said second winding includes a tap and further including second circuit means coupled between said tap and said accounting means.

3. A postage meter as defined in claim 1 or 2 including a housing enclosing the electrical components of said meter to provide protection against electromagnetic radiation.

4. A postage meter, comprising:

printing means for printing postage;

a computing means coupled to said print means for accounting for postage printed by said printing means, said computing means including a nonvolatile memory means;

a switching type regulated power supply;

a first winding having a first terminal and a second terminal, said first terminal connected to be energized by said switching type regulated power supply;

first coupling means connecting said second terminal of said first winding to said computing means, wherein said first coupling means comprises a capacitor;

a second winding oppositely poled to and electromagnetically coupled to said first winding and having a first, a second terminal and a tap terminal;

second coupling means connecting said second terminal of said second winding to said computing means;

third coupling means connecting said tap terminal of said second winding to said computing means; and said capacitor and a diode coupled between said first and said second terminal of said first winding and, wherein said diode and said capacitor are further connected to said first terminal of said second winding.

5. A postage meter as defined in claim 4 wherein said printing means includes moveable mechanical components and further including position sensing means for sensing the position of said components, said position sensing means adapted to be energized by a source of operating voltage and fifth coupling means connecting said second terminal of said first winding to said position sensing means.

6. A postage meter as defined in claim 4 including feedback means coupled between said second terminal of said first winding and said switching type regulated power supply.

7. A postage meter as defined in claim 6 wherein said nonvolatile memory means is a MNOS type device and said first coupling means connects said second terminal of said first winding to said microprocessor and said MNOS nonvolatile memory, said second coupling means connects said second terminal of said second winding to said MNOS nonvolatile memory, and said third coupling means connects said tap terminal of said second winding to said MNOS nonvolatile memory.

8. A power supply system as defined in claim 7 wherein said diode and said capacitor are connected in series between said first and said second terminal of said first winding.

9. A power supply system as defined in claim 8 further including feedback means coupled between said second terminal of said first winding and said switching type regulated power supply.

10. A power supply system as defined in claim 9 further includes a tap connection on said second winding.

11. A postage meter as defined in claim 4 wherein said computing means comprises a microprocessor and said nonvolatile memory means is a non-battery operated memory device.

12. A power supply system comprising:

a source of AC operating voltage;

a first DC power supply coupled to said source of operating voltage and providing a DC output voltage;

a switching type regulated power supply coupled to be energized by the DC output voltage from said first DC power supply and providing a switched regulated DC output voltage;

a first winding having a first terminal and a second terminal, said first terminal connected to be energized by the switched DC output voltage of said switching type regulated power supply such that a switched DC voltage is developed at said second terminal of said first winding;

a second winding oppositely poled to and electromagnetically coupled to said first winding and having a first and a second terminal; and a capacitor and a diode coupled between said first and said second terminal of said first winding, and the coupling of said capacitor and said diode forms a junction, said diode and said capacitor being further connected to said first terminal of said second winding.

13. A power supply system as defined in claim 12 wherein said junction of said diode and said capacitor and said first terminal of said second winding are connected to a point of fixed reference potential.

14. A power supply system as defined in claim 13 wherein said point of fixed reference potential is ground.

15. A power supply system as defined in claim 14 including rectifying means coupled between said first-terminal of said first winding and said switching type regulated power supply.

16. A power supply system as defined in claim 15 including rectifying means coupled to said tap connection of said second winding.

17. A power supply system as defined in claim 16 wherein said diode and said capacitor are connected in series between said first and said second terminal of said first winding.

18. A power supply system as defined in claim 17 including means for connecting both the junction of said diode and said capacitor and said first terminal of said second winding to a point of fixed reference potential.

19. A power supply system as defined in claim 18 wherein said point of fixed reference potential is ground.

20. A power supply system comprising:

a switching type regulated power supply operable to provide a switched regulated DC output voltage;

a first winding having a first terminal and a second terminal, said first terminal connected to be energized by the switched DC output voltage of said switching type regulated power supply such that a switched DC voltage is developed at said second terminal of said first winding;

a second winding oppositely poled to and electromagnetically coupled to said first winding and having a first and a second terminal; and a capacitor and a diode coupled between said first and said second terminal of said first winding; and wherein said diode and said capacitor are connected to said first terminal of said second winding.

21. A power supply system as defined in claim 20 further including feed back means coupled between said second terminal of said first winding and said switching type regulated DC power supply.

22. A power supply system as defined in claim 21 including rectifying means coupled to the second terminal of said second winding.

23. A power supply system as defined in claim 22 including rectifying means coupled to said tap connection of said second winding.

24. A power supply system as defined in claim 21 further includes a tap connection on said second winding.

* * * * *